UNITED STATES PATENT OFFICE 2,541,260

DI-N-ALKOXY SUBSTITUTED PIPERAZINE DERIVATIVES AND METHOD OF PREPARING SAME

John David Malkemus, Allendale, and John Ross, Ramsey, N. J., assignors to Colgate-Palmolive-Peet Company, Jersey City, N. J., a corporation of Delaware No Drawing. Application June 10, 1949,
Serial No. 98,394

16 Claims. (Cl. 260—268)

This invention relates to a new class of compounds derived from heterocyclic nitrogen compounds of the type represented by piperazine and alkyl-substituted piperazines.

More particularly, the invention relates to a new class of compounds of the foregoing nature that are characterized by the presence in the molecule of (a) the ring structure or nucleus of the heterocyclic nitrogen compound piperazine, (b) a long-chain aliphatic radical of from 6 to 24 carbon atoms and (c) three or more alkoxy groups of which at least one is attached to each of the two hetero-nitrogen atoms. Still more particularly, the invention relates to a new class of compounds that are derivatives of piperazine or an alkyl-substituted piperazine, further characterized by the presence of two side-chain substituents at the hetero-nitrogen atoms, one such substituent including a long-chain aliphatic radical of from 6 to 24 carbon atoms and at least one alkoxy radical, such as ethoxy, and the other side-chain substituent including at least two alkoxy radicals, such as ethoxy, the terminal oxygen atom of which is attached to H or to a short-chain acyl or short-chain varying from one to three carbon atoms.

The invention further relates to a new class of compounds having excellent foaming, derging, wetting and lime-soap-dispersing properties.

The invention also relates to processes for preparing compounds of the foregoing nature.

It is an object of the present invention to provide a new class of compounds having enhanced surface activity for many industrial uses where surface-active compounds are required.

It is a further object of the invention to provide a new class of compounds having surface-active properties characterized in that they are derivatives of a heterocyclic nitrogen compound of the class consisting of piperazine and alkyl-substituted piperazines in which one of the hetero-nitrogen atoms has attached thereto a side chain including at least one alkoxy radical, such as ethoxy, and a long chain ($C_6$ to $C_{24}$) aliphatic radical, and in which the remaining hetero-nitrogen atom of the piperazine nucleus has attached thereto a side chain including at least two alkoxy radicals, such as ethoxy, the terminal oxygen atom of which is attached to H or to a short-chain alkyl or a short-chain acyl radical, the length of the short chain varying from one to three carbon atoms.

The manner in which these and other objects of the invention are achieved will become apparent from the following description.

In accordance with the present invention it has been discovered that a new class of compounds useful as intermediates and as foaming, derging, wetting and lime-soap-dispersing agents may be obtained by suitable syntheses to be described more fully hereinafter, employing as starting materials (1) either (a) a relatively high molecular weight fatty acid (R.COOH) having from 6 to 24 carbon atoms, and preferably a fatty acid having from 12 to 18 carbon atoms, the acid being saturated or unsaturated and with or without substituents such as hydroxyl, etc. or (b) a relatively high molecular weight aliphatic halide (R.X) having from 6 to 24 carbon atoms, and preferably having from 12 to 18 carbon atoms, the aliphatic portion being saturated or unsaturated and with or without substituents such as hydroxyl, etc.; (2) a convenient source of an alkoxy radical such as ethylene oxide, and (3) piperazine or an alkyl-substituted piperazine in which the alkyl substituents are preferably of not more than two carbon atoms.

The novel compounds that are obtained in accordance with the present invention in its broadest aspects fall in the class represented by the following general structural formula:

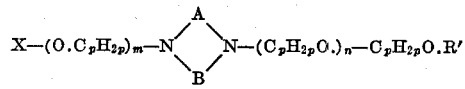

where X is selected from the class consisting of R and R.CO; A and B are selected from the class consisting of unsubstituted ethylene radicals and ethylene radicals having from one to four short-chain alkyl substituents of not more than two carbon atoms each; R is a long-chain aliphatic radical such that the carbon atom content of X varies from 6 to 24 carbon atoms, and preferably from 12 to 18 carbon atoms; R' may be hydrogen, a short-chain alkyl radical or a short-chain acyl radical, the length of the short chains varying from one to three carbon atoms; $m$ and $n$ are whole numbers varying from 1 to 20, and $p$ is a small whole number at least 2, and preferably varying from 2 to 4.

A preferred class of novel compounds within the general class set forth above is represented by those compounds containing ethoxy radicals in the side-chain substituents and having no alkyl substituents attached to any of the ring carbon atoms, and corresponding to the following general structural formula:

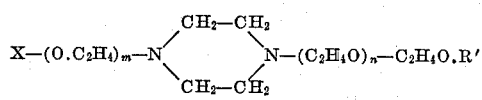

where the various letters have the same meaning as in the immediately preceding formula.

While the foregoing structural formulae aptly represent the general class of compounds with which in its broadest aspects the present invention is concerned, it may also be found convenient to consider the various new compounds that are comprehended within the scope of the present invention as falling within the following two sub-classes of compounds, corresponding respectively to long-chain ester and ether derivatives of piperazine or alkyl-substituted piperazine, respectively. For simplicity these formulae are confined to those compounds containing ethoxy (—O.C₂H₄—) radicals, it being understood however that alkoxy compounds broadly are contemplated:

Ia     R.CO(OC₂H₄)$_m$.N(C₂H₄)₂N.(C₂H₄O)$_n$—C₂H₄O.R'

Ib     R(OC₂H₄)$_m$.N(C₂H₄)₂N.(C₂H₄O)$_n$—C₂H₄O.R'

In each of the foregoing formulae R, R', $m$ and $n$ have the same meanings as before, it being understood that R is a long-chain aliphatic radical such that the carbon content of the entire radical (i. e., R.CO— and R—, respectively) attached to the terminal ethoxy radical varies from 6 to 24 carbon atoms, and preferably from 12 to 18 carbon atoms.

It will be noted that Formula Ia represents a long-chain fatty acid ester derivative of piperazine wherein the long-chain acyl radical is separated from the heterocyclic nitrogen ring structure by at least one ethoxy radical, whereas Formula Ib represents a long-chain aliphatic ether derivative of piperazine in which the long-chain aliphatic radical is similarly separated from the heterocyclic nitrogen ring structure by at least one ethoxy radical. Furthermore, in each case the second hetero-nitrogen atom of the piperazine nucleus carries as a substituent a side chain including at least two ethoxy radicals the terminal oxygen atom of which is linked to H or to a short-chain acyl or alkyl substituent of from one to three carbon atoms.

Before discussing suitable methods of syntheses for the compounds disclosed, it may be well to point out at this stage of the description that the values of $m$ and $n$ in the preceding formulae are preferably so chosen as to bring about a desired degree of hydrophilic and hydrophobic properties of the resulting molecule, depending upon the intended use for the given compound. In other words, it is readily possible so to adjust the values of $m$ and $n$ that the resulting compound will show affinities toward both aqueous liquids and oily liquids. Under certain circumstances it may be desirable to produce a specific compound whose affinity for aqueous liquids materially exceeds its affinity for oily liquids, or conversely. For example, certain types of ore flotation processes may require flotation agents or assistants possessing such predetermined properties as regards their respective affinities toward aqueous and oily components, depending for example upon factors such as the nature of the ore undergoing treatment and the particular ingredients thereof being recovered. Also in the treatment of textile materials, such factors as the nature of the textile fibres being treated as well as the presence of other ingredients of the treating composition may render it desirable to produce compounds in accordance with the present invention having certain surface-active properties, as determined in part by the total number of alkoxy radicals present in the side chains. Accordingly, the ability readily to produce compounds of desirable surface-active properties to fit the requirements of any particular use or class of uses is one of the features of the present invention.

In making the long-chain fatty acid ester derivatives of piperazine in accordance with the present invention, a wide variety of carboxylic acids may be employed as starting material. For example, suitable carboxylic acids include lauric acid, myristic acid, palmitic acid, stearic acid, hydroxystearic acid, oleic acid, ricinoleic acid, lauryl succinic acid, caprylic acid, isocaprylic acid, caproic acid, alpha-aminocapric acid, undecylenic acid, linoleic acid, linolenic acid, lignoceric acid, erucic acid, chloropalmitic acid, mixed coconut oil fatty acids, mixed tallow fatty acids, mixtures of any of these acids, etc. Similarly, lower alkyl esters of any of these acids (that is esters of alcohols having from one to about six carbon atoms, such esters including methyl, ethyl, propyl and isopropyl esters, etc.), may also be employed to form the desired long-chain ester derivatives by an alcoholysis reaction. Also the chlorides, bromides and iodides of the aliphatic compounds corresponding to these acids may be employed in order to provide the corresponding ethers of the present invention; to mention only a few of the suitable alkyl halides by way of example: dodecyl, tetradecyl, hexadecyl, octadecyl, hydroxy-octadecyl, Δ9-octadecenyl (corresponding to oleyl alcohol), Δ9,12 octadecadienyl (corresponding to linoleyl alcohol), Δ9,12,15-octadecatrienyl (corresponding to ricinoleyl alcohol), hexyl, iso-octyl, etc.

The compounds according to the present invention may be prepared as follows, reference being made for the sake of simplicity to the preparation of derivatives of piperazine containing no substituents in the heterocyclic ring other than at the hetero-nitrogen atoms: Piperazine is reacted with ethylene oxide under conditions such as to yield first diethanol piperazine followed by the introduction of one or more ethoxy radicals into either or both the ethanol side chains, ethylene oxide being passed into a refluxing solution of piperazine in methyl alcohol until two mols are absorbed in accordance with the following reaction:

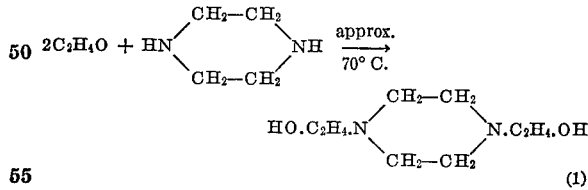

(1)

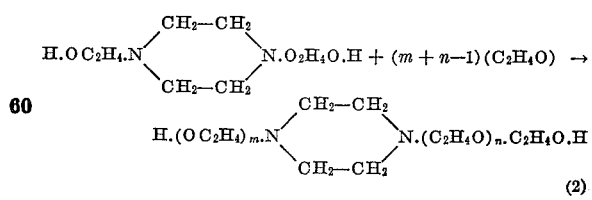

(2)

It will be understood that the total number of ethoxy radicals present in each of the side-chain substituents may be the same or different, i. e., $m$ may or may not be made equal to $(n+1)$, at will, depending upon the reaction conditions. For convenience in what follows in this section it will be assumed that $m$ does equal $(n+1)$, e. g., that each side chain-substituent contains the same number of ethoxy radicals. Furthermore, and in any event, the reaction product actually consists of a complex mixture where $m$ and $n$ merely indicate the average composition thereof.

The reaction product thus obtained is reacted with a long-chain fatty acid, R.COOH, in an amount not greatly in excess of that required to produce the monoester, in accordance with the following reaction:

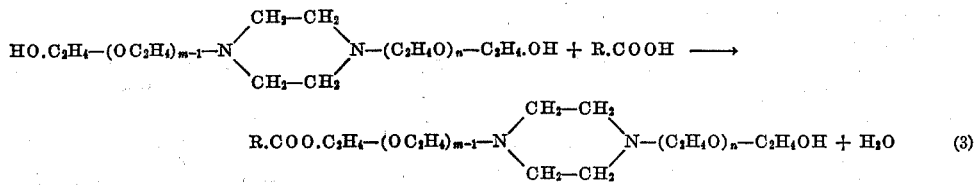

In accordance with the foregoing reaction the monoester is produced in admixture with a certain proportion of the diester obtained by esterification of the second terminal hydroxy group.

However, instead of carrying out the esterification by means of a long-chain fatty acid, R.COOH, as indicated above, one may employ at this point a lower alkyl ester of the desired long-chain fatty acid, R.COO.alk, in an alcoholysis type reaction in the presence of a small amount (varying from traces up to approximately 2% by weight of the combined reactants) of a catalyst comprising caustic alkali such as NaOH, the reaction proceeding as follows:

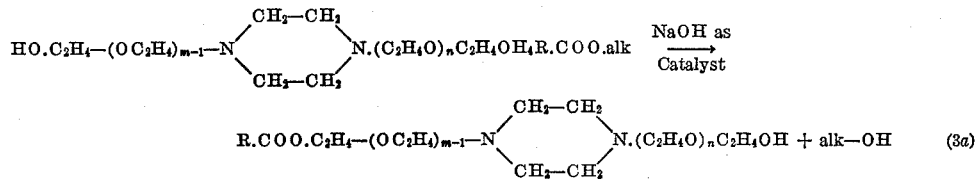

In order to produce the long-chain aliphatic ether derivatives having the Formula Ib instead of the ester derivatives of Formula Ib, then the reaction product obtained from the procedure shown in Equation 2 above is reacted with an alkali metal, such as metallic sodium, in the ratio substantially of one gram-atom of the latter to one mol of the former, resulting in the production of the monosodium derivative in accordance with the following equation:

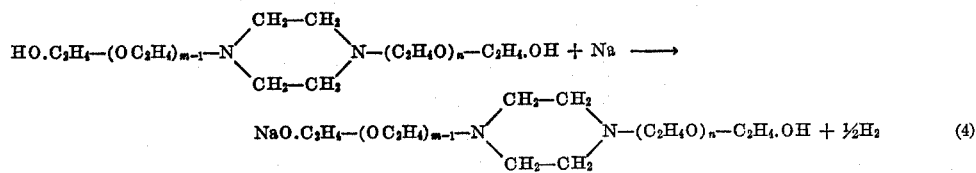

This monosodium derivative is then treated with a long-chain aliphatic halide, RX (Williamson reaction), to produce the corresponding ether derivative of Formula Ib, in accordance with the following equation:

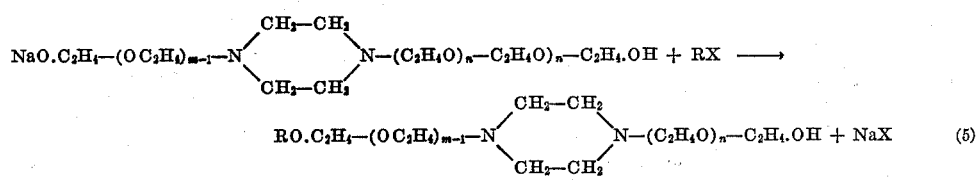

When it is desired to prepare compounds of the type shown in Formulae Ia and Ib wherein R' is a short chain alkyl or acyl radical instead of hydrogen as in the immediately preceding description, this may be done very conveniently by subjecting the products obtained either before or after the desired long-chain aliphatic radical, i. e., R.CO— or R—, has been introduced therein, i. e., the reaction products resulting from the procedure of Equations 3, 3a or 5, to further treatment to etherify or esterify (respectively) the free terminal hydroxy group with an etherifying or with an esterifying reagent as desired.

In the case of etherification, this further treatment involves reaction with an alkali metal such as metallic sodium, followed by reaction between the resulting sodium derivative and a short-chain alkyl halide, R'X, finally resulting in products of the formula:

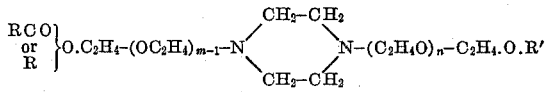

where R', as above, represents a short-chain alkyl group of from one to three carbon atoms.

In the case of esterification, the further treatment referred to in the second preceding paragraph involves reaction with a short-chain fatty acid, R'.COOH, or with a short chain alkyl ester of such a short-chain fatty acid, viz., R'.COO.alk, finally resulting in products of the formula:

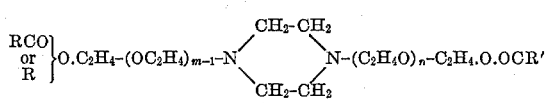

where R'.CO represents a short-chain acyl group of from one to three carbon atoms.

In general, it is ordinarily preferred to employ substantially the stoichiometric ratios of reactants that are indicated by the foregoing equations. However, considerable departure from these ratios can be tolerated in many instances without serious detriment to either yields or quality of product. In connection with the reactions illustrated above as Reactions 3, 3a, 4 and 5, however, if one resorts to the use of other than substantially stoichiometric ratios of reactants it is ordinarily preferred to modify this ratio in the direction of providing an excess of piperazine, thereby decreasing the yield of undesired by-products. Thus proportions as high as about two to five mols of piperazine derivative for each mol of other reactant in accordance with each of Reactions 3, 3a, 4 and 5 also represent a desirable procedure.

The long-chain aliphatic ester and ether derivatives prepared according to the present invention possess very desirable surface-active properties. The novel compounds described herein exhibit desirable surface-active properties in both acid and alkaline media, although they appear to change in character from a cationic active form to a non-ionized form, depending upon the pH of the environment in which they are employed. They are excellent detergents and are also valuable as wetting, foaming and lime-soap-dispersing agents. Under certain circumstances they may be in fact superior to conventional fatty acid soaps for use as detergents. They may be used either alone or in combination with other surface-active compounds of the type of sulphate and/or sulphonated organic compounds, in view of the fact that they are in general wholly compatible therewith.

The novel compounds contemplated as falling within the scope of the present invention may be made up in dilute or concentrated aqueous solution, with or without the presence of a substantial content of a low molecular weight alcohol such as ethyl alcohol, or they may be made into a dry or partially hydrated solid product, depending upon economical or other considerations. Adjuvant materials may be admixed with these compounds to form flakes, granular particles, cakes, pastes or other physical forms of the mixture, or such adjuvant materials may be added to aqueous or other solutions of the compound. Such adjuvant materials may include sodium chloride, sodium sulphate, sodium pyrophosphate, as well as other builders and/or fillers employed in the soap and synthetic detergent arts generally, care being taken to avoid the use of any additives which would substantially diminish the effectiveness of the resulting composition. Those skilled in the art will of course appreciate that the type of addition agent to be employed depends at least in part upon the ultimate use to which the product is to be put.

The properties of the specific compounds of the present invention vary to some degree, depending upon the particular starting materials from which they are prepared, but all are surface-active agents having valuable wetting, deterging, emulsifying, softening, foaming and lime-soap-dispersing properties. They are suitable for use as assistants in the textile and related industries where they may be employed for softening fabrics, fixing colors, removing grease and oil, penetrating, etc. They are also of use in the ore flotation art as addition agents to the ore treating baths employed for separating various constituents of ores. They are also of value in the cosmetic industry as emulsifying agents and for stabilizing emulsions.

In order to indicate even more fully the nature of the present invention, the following examples of typical procedure are set forth, it being understood that these examples are presented as illustrative only and they are not intended to limit the scope of the invention. The parts given are parts by weight unless otherwise indicated.

*Example IA*

A solution of 344 parts of piperazine in 500 parts methyl alcohol is heated on a steam bath under a reflux condenser while ethylene oxide gas is passed into the mixture until 176 parts have been absorbed. The product is then distilled while slowly passing nitrogen through the apparatus, and finally under reduced pressure, until practically all of the monoethanol derivative of piperazine has been collected. This material is a viscose oil, boining at 125-127° C./12 mm. $n_D^{25}$ 1.5052, $d_4^{20}$ 1.0595. The residue of this distillation consists mainly of diethanol piperazine which may be obtained as shining white crystals, M. P. 134-135° C., by recrystallizing from ethyl or methyl alcohol, and in accordance with the following reactions:

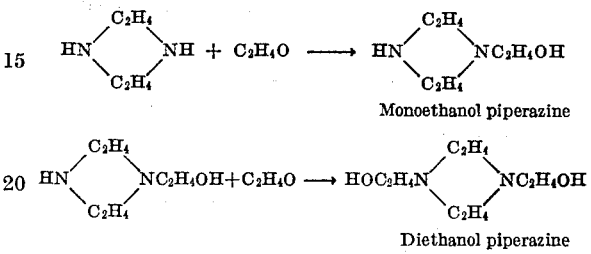

174 parts of diethanol piperazine are heated under nitrogen in the presence of a trace of alkali to about 170° C. and then ethylene oxide is slowly passed into the mixture while the temperature is held in the range 170°-190° C. until 176 parts by weight have been absorbed. The resulting yellow viscous oil contains a substantial proportion of N, N'-di(hydroxyethyloxyethoxyethyl) piperazine.

This product is reacted with a slightly equimolar excess of palmitic acid at 180° C. The final product contains a large proportion of N, N'-di hydroxyethyloxyethoxyethyl) piperazine-monopalmitate and corresponds to the formula:

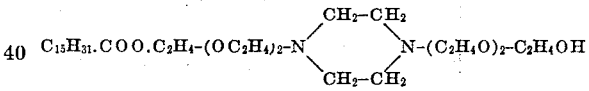

A portion of the foregoing compound is reacted further with an equimolar portion of acetic anhydride. The end product is N, N'-di(hydroxyethyloxyethoxyethyl) - piperazine - monopalmitate-monoacetate.

*Example IB*

In order to produce the corresponding long-chain aliphatic ether derivatives, N, N'-di(hydroxyethyloxyethoxyethyl) piperazine (prepared as in Example IA above) is treated directly with its gram-atomic equivalent of metallic sodium. The product containing a large proportion of the monosodium derivative is reacted with a substantially equimolar portion of hexadecyl chloride, giving as the final product principally the monohexadecyl ether of N, N'-di(hydroxyethyloxyethoxyethyl)-piperazine corresponding to the formula:

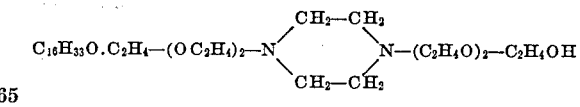

Two portions of this product are further reacted, one with a gram-atom equivalent of sodium followed by an equimolar portion of ethyl bromide, the other with an equimolar portion of acetic anhydride. The respective products obtained thereby are the monohexadecyl-monoethyl diether of N, N'-di(hydroxyethyloxyethoxyethyl)-piperazine and the monohexadecyl ether of N, N'-di(hydroxyethyloxyethoxyethyl)-piperazine-monoacetate.

Example IC 90 parts of diethanol piperazine are reacted with ethylene oxide under the same conditions employed in Example IA until 310 parts by weight are absorbed. The average composition of the product, which is a viscous orange oil, is represented by the following formula:

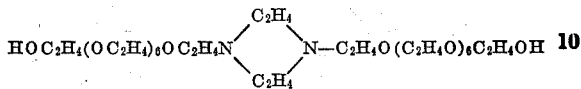

in which each nitrogen atom is attached to a chain of eight ethoxy groups.

Example ID

Sixty-five parts of monoethanol piperazine and 69 parts of methoxyethoxyethyl chloride are mixed and the temperature of the mass gradually raised to 110° C. and then held at this temperature for several hours. The product is then made alkaline with caustic soda solution and the free base, N-hydroxyethyl-N'-methoxy-ethoxyethyl piperazine (denoted by (A) in the following examples) is extracted with isopropyl alcohol.

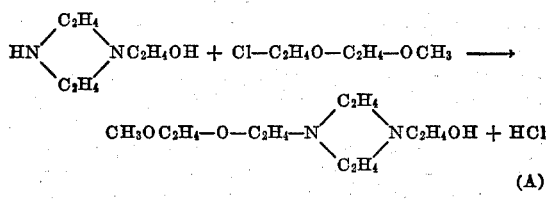

Example II 100 parts of (A) is heated with 110 parts of methyl stearate in the presence of a trace of caustic at about 100° C. until practically all of the theoretical amount of methanol distills from the mixture, the last traces of methanol being removed under reduced pressure. The reaction may be represented as follows:

(A) + C₁₇H₃₅COO—CH₃ ⟶

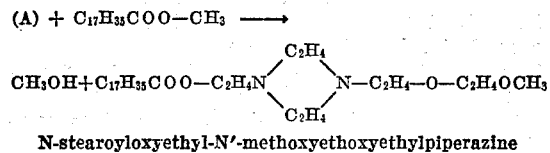

N-stearoyloxyethyl-N'-methoxyethoxyethylpiperazine

Example III 100 parts of (A) treated with 8 parts of sodium in refluxing dioxane solution until the metal has completely reacted. Then the mixture is heated with 65 parts of a mixture of that obtained from mixed coco fatty acids (via reduction to alcohols followed by conversion to alkyl chlorides) for a few hours at 120° C. The reaction product is represented by the following formula:

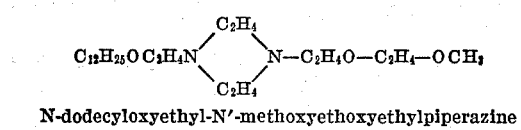

N-dodecyloxyethyl-N'-methoxyethoxyethylpiperazine

Example IV

To 135 parts of (A) is added a small amount of caustic (about 1%) and after displacing the air in the reaction vessel with nitrogen the mixture is heated to about 180° C. followed by passing ethylene oxide gas under the surface of the liquid until 175 parts by weight have been absorbed. The product is a yellow viscous oil whose average composition may be represented by:

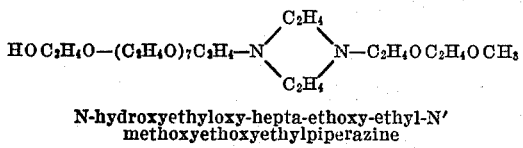

N-hydroxyethyloxy-hepta-ethoxy-ethyl-N'-methoxyethoxyethylpiperazine

This compound is hereinafter designated (B).

Example V 62 parts of (B) heated with 20 parts of mixed coconut oil fatty acids in the presence of a trace of caustic at 100° C. to 150° C. under reduced pressure for about an hour. This results in the elimination of one mol of water and the formation of the corresponding ester:

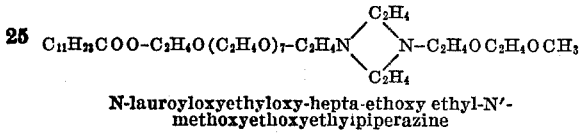

N-lauroyloxyethyloxy-hepta-ethoxy ethyl-N'-methoxyethoxyethyipiperazine

Example VI

After treating 620 parts of (B) with 23 parts of sodium in refluxing dioxane, 200 parts of dodecyl chloride is added and the mixture is gradually raised to 130° C. and held there for a short time. This results in the formation of:

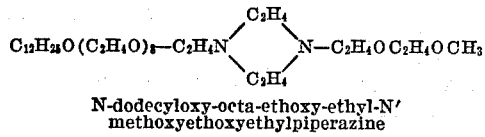

N-dodecyloxy-octa-ethoxy-ethyl-N'-methoxyethoxyethylpiperazine

Example VII

To 350 parts of crude N,N'-di(hydroxyethyl-oxyethoxyethyl)-piperazine is slowly added 80 parts of acetyl chloride and the temperature of the stirred mixture is gradually raised to and held at 60–80° C. for about an hour. Then 220 parts of lauroyl chloride are slowly added to the mixture while the temperature is kept in the range 50 to 75° C. The resulting light brown paste contains a substantial proportion of N-acetoxyethoxyethoxyethyl-N' - lauroyloxyethoxyethoxyethylpiperazine.

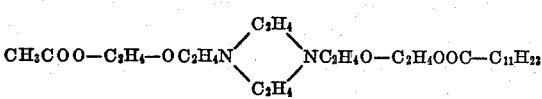

Example VIII 80 parts of the polyethoxyethanolpiperazine prepared according to Example IC is heated with 20 parts of methyl laurate at 100° C. in the presence of a trace of caustic for about an hour. The reaction product is a brown oil which contains a considerable proportion of the monolaurate ester of the polyethoxypiperazine

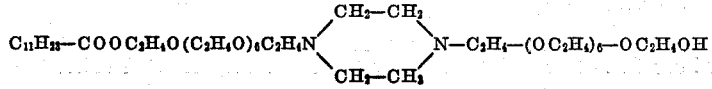

In order to show typical ways in which compounds of the foregoing type may be employed, the following examples are set forth:

*Example A*

Two parts of the palmitic ester derivative of di(ethoxyethoxyethanol) piperazine, obtained according to the procedure of Example IA above, are dissolved in 198 parts of water to give a 1% aqueous solution of the product. This solution foamed well on agitation, and portions thereof added to acid and to alkaline solutions, followed by adjusting the solutions to pH's of 3.5 and 9.5 respectively, resulted in the production of dilute aqueous solutions which gave generous quantities of foam, and which showed good detersive efficiencies, when used in water having about 300 parts per million of hardness calculated as calcium carbonate. The detersive efficiency was of the same order of magnitude in both acid and alkaline media.

*Example B*

One part of the product of Example V is dissolved in 99 parts of water to give a 1% solution. The resulting mixture shows excellent foaming and detersive characteristics in both acid and alkaline solutions (pH 4.5 and 8.5 respectively).

While various specific examples of preferred compositions and methods embodying the present invention have been described above, it will be apparent that many changes and modifications may be made in the methods of procedure and that a wide variety of specific reagents may be employed in carrying out the procedure. It should therefore be understood that the examples cited and the particular proportions, methods of procedure and compounds set forth above are intended to be illustrative only and are not intended to limit the scope of the invention.

What is claimed is:

1. A piperazine derivative having the following structural formula:

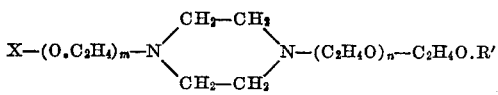

where X is selected from the class consisting of R and R.CO; R is a long-chain aliphatic radical such that the carbon atom content of X varies from 6 to 24 carbon atoms; R' is selected from the class consisting of H, short-chain alkyl and short-chain acyl radicals; and $m$ and $n$ are whole numbers varying from 1 to 20.

2. A piperazine derivative having the following structural formula:

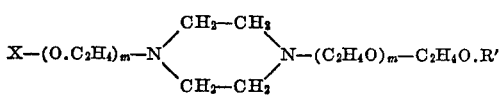

where X is selected from the class consisting of R and R.CO; R is a long-chain aliphatic radical such that the carbon atom content of X varies from 6 to 24 carbon atoms; R' is selected from the class consisting of H, short-chain alkyl and short-chain acyl radicals, the length of the short chain varying from 1 to 3 carbon atoms; and $m$ and $n$ are whole numbers varying from 1 to 20.

3. A piperazine derivative having the following structural formula:

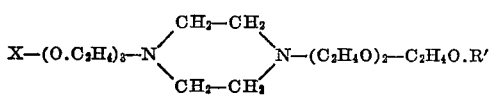

where X is selected from the class consisting of R and R.CO; R is a long-chain aliphatic radical such that the carbon atom content of X varies from 6 to 24 carbon atoms; and R' is selected from the class consisting of H, short-chain alkyl and short-chain acyl radicals.

4. A piperazine derivative having the following structural formula:

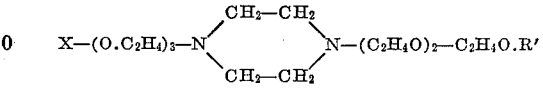

where X is selected from the class consisting of R and R.CO; R is a long-chain aliphatic radical such that the carbon atom content of X varies from 6 to 24 carbon atoms; and R' is selected from the class consisting of H, short-chain alkyl and short-chain acyl radicals, the length of the short chain varying from 1 to 3 carbon atoms.

5. A compound selected from the class consisting of esters and ethers having the piperazine nucleus and two side-chain substituents attached to the hetero-nitrogen atoms thereof, one side-chain substituent consisting of from 1 to 20 ethoxy radicals the terminal oxygen atom of which is linked to a radical selected from the class consisting of acyl and alkyl radicals corresponding in carbon atom content to the average carbon atom content of coconut fatty acids and the alcohols derived therefrom, respectively, and the other side chain substituent consisting of from 2 to 21 ethoxy radicals the terminal oxygen atom of which is linked to a radical selected from the class consisting of H, and acyl and alkyl radicals of from 1 to 3 carbon atoms.

6. A compound selected from the class consisting of esters and ethers having the piperazine nucleus and two side-chain substituents attached to the hetero-nitrogen atoms thereof, one side-chain substituent consisting of from 1 to 20 ethoxy radicals the terminal oxygen atom of which is linked to a radical selected from the class consisting of octadecanoyl and octadecyl radicals, respectively, and the other side-chain substituent consisting of from 2 to 21 ethoxy radicals the terminal oxygen of which is linked to a radical selected from the class consisting of H, and acyl and alkyl radicals of from 1 to 3 carbon atoms.

7. A compound selected from the class consisting of esters and ethers having the piperazine nucleus and two side-chain substituents attached to the hetero-nitrogen atoms thereof, one side-chain substituent consisting of from 1 to 20 ethoxy radicals the terminal oxygen atom of which is linked to a radical selected from the class consisting of hexadecanoyl and hexadecyl radicals, respectively, and the other side-chain substituent consisting of from 2 to 21 ethoxy radicals the terminal oxygen atom of which is linked to a radical selected from the class consisting of H, and acyl and alkyl radicals of from 1 to 3 carbon atoms.

8. A piperazine derivative having the following structural formula

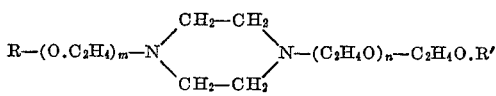

where R is a long-chain aliphatic radical having a carbon content of from 6 to 24 carbon atoms; R' is selected from the class consisting of H, short-chain alkyl and short-chain acyl radicals, and $m$ and $n$ are whole numbers varying from 1 to 20.

9. A piperazine derivative having the following structural formula

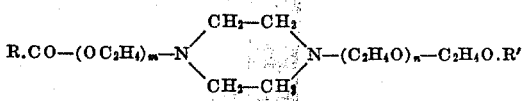

wherein the radical R.CO contains from 6 to 24 carbon atoms; R' is selected from the class consisting of H, short-chain alkyl and short-chain acyl radicals, and m and n are whole numbers varying from 1 to 20.

10. A piperazine derivative having the following structural formula:

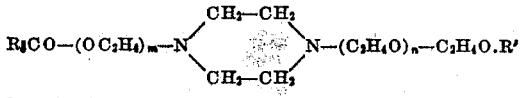

wherein the radical R.CO contains from 6 to 24 carbon atoms; R' is a short-chain alkyl radical, and m and n are whole numbers varying from 1 to 20.

11. A process for preparing surface-active compounds which comprises reacting (a) a compound having the following structural formula:

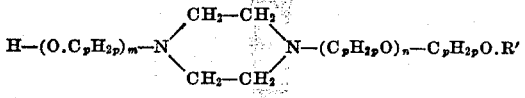

where R' is selected from the class consisting of H, short-chain alkyl and short-chain acyl radicals; m and n are whole numbers varying from 1 to 20; and p is a small whole number varying from 2 to 4, with (b) a member of the class consisting of carboxylic acids and their lower alkyl esters wherein the carboxylic acid radical has from 6 to 24 carbon atoms, and recovering the resulting high molecular weight ester.

12. A process for preparing surface-active compounds which comprises reacting (a) a compound having the following structural formula:

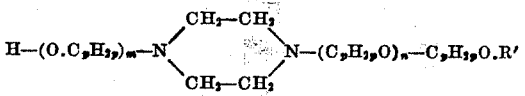

where R' is selected from the class consisting of H, short-chain alkyl and short-chain acyl radicals, the length of the short chain varying from 1 to 3 carbon atoms; m and n are whole numbers varying from 1 to 20; and p is a small whole number varying from 2 to 4, with (b) a member of the class consisting of carboxylic acids and their lower alkyl esters wherein the carboxylic acid radical has from 6 to 24 carbon atoms, and recovering the resulting high molecular weight ester.

13. A process for preparing surface-active compounds which comprises reacting (a) a compound having the following structural formula:

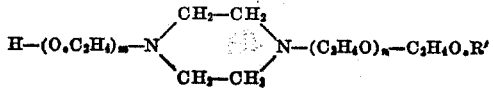

where R' is selected from the class consisting of H, short-chain alkyl and short-chain acyl radicals, the length of the short chain varying from 1 to 3 carbon atoms; and m and n are whole numbers varying from 1 to 20, with (b) a member of the class consisting of carboxylic acids and their lower alkyl esters wherein the carboxylic acid radical has from 6 to 24 carbon atoms, and recovering the resulting high molecular weight ester.

14. A process for preparing surface-active compounds which comprises reacting (a) a compound having the following structural formula:

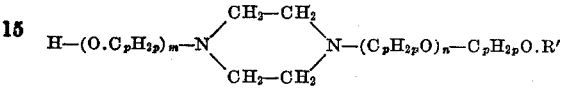

where R' is selected from the class consisting of H, short-chain alkyl and short-chain acyl radicals; m and n are whole numbers varying from 1 to 20; and p is a small whole number varying from 2 to 4, with (b) free alkali metal to form an alkoxide, and thereafter reacting the alkoxide with an alkyl halide having from 6 to 24 carbon atoms, and recovering the resulting high molecular weight ether.

15. A process for preparing surface-active compounds which comprises reacting (a) a compound having the following structural formula:

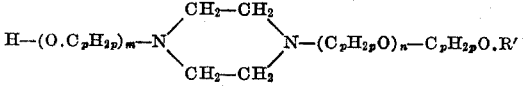

where R' is selected from the class consisting of H, short-chain alkyl and short-chain acyl radicals, the length of the short chain varying from 1 to 3 carbon atoms; m and n are whole numbers varying from 1 to 20; and p is a small whole number varying from 2 to 4, with (b) free alkali metal to form an alkoxide, and thereafter reacting the alkoxide with an alkyl halide having from 6 to 24 carbon atoms, and recovering the resulting high molecular weight ester.

16. A process for preparing surface-active compounds which comprises reacting (a) a compound having the following structural formula:

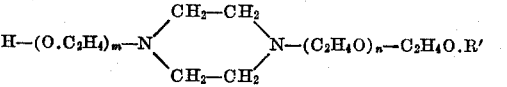

where R' is selected from the class consisting of H, short-chain alkyl and short-chain acyl radicals, the length of the short chain varying from 1 to 3 carbon atoms; and m and n are whole numbers varying from 1 to 20, with (b) free alkali metal to form an alkoxide, and thereafter reacting the alkoxide with an alkyl halide having from 6 to 24 carbon atoms, and recovering the resulting high molecular weight ether.

J. DAVID MALKEMUS.
JOHN ROSS.

No references cited.